United States Patent
Takahashi

(10) Patent No.: US 11,867,456 B2
(45) Date of Patent: Jan. 9, 2024

(54) LOW-TEMPERATURE STORAGE SYSTEM

(71) Applicant: TSUBAKIMOTO CHAIN CO., Osaka (JP)

(72) Inventor: Tomokatsu Takahashi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 378 days.

(21) Appl. No.: 17/369,462

(22) Filed: Jul. 7, 2021

(65) Prior Publication Data

US 2021/0333044 A1    Oct. 28, 2021

Related U.S. Application Data

(63) Continuation of application No. PCT/JP2019/042175, filed on Oct. 28, 2019.

(30) Foreign Application Priority Data

Jan. 15, 2019   (JP) ................. 2019-004587

(51) Int. Cl.
*F25D 25/04*    (2006.01)
*B65G 1/06*    (2006.01)
(Continued)

(52) U.S. Cl.
CPC .............. *F25D 25/04* (2013.01); *B65G 1/06* (2013.01); *B66F 3/08* (2013.01); *F25D 23/026* (2013.01); *F25D 23/028* (2013.01)

(58) Field of Classification Search
CPC ...... F25D 25/04; F25D 23/026; F25D 23/028; B65G 1/06; B66F 3/08
(Continued)

(56) References Cited

U.S. PATENT DOCUMENTS

2017/0210560 A1*  7/2017  Asukai ............... B01L 7/50
2018/0202908 A1   7/2018  Croquette et al.
(Continued)

FOREIGN PATENT DOCUMENTS

JP   2012-56730 A   3/2012
JP   2016-88659 A   5/2016
(Continued)

OTHER PUBLICATIONS

International Search Report dated Jan. 28, 2020, issued in counterpart International Application No. PCT/JP2019/042175, with English Translation. (4 pages).

*Primary Examiner* — Saul Rodriguez
*Assistant Examiner* — Willie W Berry, Jr.
(74) *Attorney, Agent, or Firm* — WHDA, LLP

(57) ABSTRACT

A low-temperature storage system 100 is provided, which can, with a simple structure, minimize heat transfer into the low-temperature storage chamber, reduce the operation noise, allow easy positioning of a reciprocating part inside the low-temperature storage chamber, and preclude device bulkiness outside the low-temperature storage chamber. The low-temperature storage system 100 includes a low-temperature storage chamber 110, and a transfer mechanism 120. The transfer mechanism 120 includes an in-storage unit 121 and an external unit 140. The in-storage unit 121 includes a reciprocating part 122 that holds the storage objects C, a turn guide 126 that guides the reciprocating part 122, and a lift member 131 that causes the reciprocating part 122. The external unit 140 includes a torque transmission part 141, a lift transmission part 147, and a detachable moving part 150 that drives the torque transmission part 141 and lift transmission part 147.

6 Claims, 8 Drawing Sheets

(51) Int. Cl.
*B66F 3/08* (2006.01)
*F25D 23/02* (2006.01)

(58) Field of Classification Search
USPC .......................................................... 414/267
See application file for complete search history.

(56) References Cited

U.S. PATENT DOCUMENTS

2019/0276233 A1* 9/2019 Caveney ............... F25D 29/001
2019/0293344 A1* 9/2019 Sun .......................... G01N 1/42

FOREIGN PATENT DOCUMENTS

| JP | 2017-57027 A | 3/2017 |
| JP | 6177216 B2 | 8/2017 |
| JP | 2018-529062 A | 10/2018 |

* cited by examiner

LOW-TEMPERATURE STORAGE SYSTEM

TECHNICAL FIELD

The present invention relates to a low-temperature storage system that stores storage objects at low temperatures, and more particularly to a low-temperature storage system that stores samples for drug development used in the processes of discovering and designing drugs in medical science, bioengineering, and pharmaceutical sciences, at low temperatures; a transfer mechanism; and a low-temperature storage chamber.

BACKGROUND ART

Low-temperature storage systems that store containers containing samples at low temperatures have hitherto been known. One such low-temperature storage system 100 (see, for example, Patent Literature 1) includes a storage tray that accommodates, in an up-and-down direction, a plurality of storage plates 203 each holding a plurality of storage objects (containers 201), a low-temperature storage chamber (low-temperature storage chamber 105) storing a plurality of storage trays, an operation room 106 provided adjacent the low-temperature storage chamber (low-temperature storage chamber 105) and kept at a lower temperature than that of the external environment, a loading/unloading chamber 108 provided adjacent the operation room 106, a transfer mechanism (plate transport mechanism 110) provided inside the operation room 106 to transfer the storage plates 203 and load and unload the same to and from the storage tray 203, and a pickup mechanism 120 provided in the operation room 106 and capable of picking storage objects (containers 201) individually from a storage plate 203.

The transfer mechanism (plate transport mechanism 110) includes storage tray moving means that moves the storage trays individually between the low-temperature storage chamber (low-temperature storage chamber 105) and the operation room 106 in the up-and-down direction, and storage plate moving means 112 that moves the storage plates 203 individually out of and onto a storage tray. The transfer mechanism is configured to be movable inside the operation room 106.

In this low-temperature storage system 100 of Patent Literature 1, a plurality of storage objects (containers 201) are held on a storage plate 203, and a plurality of storage plates 203 are held on a storage tray. When a desired storage object (container 201) is to be retrieved from the low-temperature storage chamber (low-temperature storage chamber 105), the storage tray is removed from the low-temperature storage chamber 105, after which the storage plate 203 is taken out of the storage tray in the operation room 106, and the desired storage object (container 201) is picked up from this storage plate 203.

In the low-temperature storage system 100 of Patent Literature 1, the storage tray needs to be taken out of the low-temperature storage chamber 105 when retrieving a desired storage object (container 201) from the low-temperature storage chamber 105. This means that undesired storage plates 203 and storage objects (containers 201) are also moved out of the low-temperature storage chamber 105 to the operation room 106. In the operation room 106 where the temperature is higher than that in the low-temperature storage chamber 105, the temperature of the storage objects (containers 201) other than a desired storage object (container 201) is also raised. This could result in deterioration of the quality of the samples contained in the storage objects (containers 201), and also lead to the problem that the temperature of the low-temperature storage chamber 105 rises when the storage tray with elevated temperature is returned to the low-temperature storage chamber 105, and a high cost may be required for the cooling material for cooling the low-temperature storage chamber 105.

A low-temperature storage system 1 (see, for example, Patent Literature 2) for solving the above problem is known, which includes a low-temperature storage chamber 10, the interior of which is kept at a low temperature, a plurality of disc-like rotary stages 13 disposed inside the low-temperature storage chamber 10, a transfer mechanism 20 carrying storage plates P into and out of the low-temperature storage chamber 10, and a picking mechanism used for transferring a container C held on a storage plate P to another storage plate P.

The transfer mechanism 20 of the low-temperature storage system 1 described in Patent Literature 2 includes a reciprocating part 30 provided such as to be movable up and down along the up-and-down direction, and guide means 40 that guides the reciprocating part 30 along the up-and-down direction. The reciprocating part 30 is moved up and down, in and out of the low-temperature storage chamber 10 by a pair of engaging chains 32. An in-storage guide 50, to which a drive force is transmitted from an external storage guide 70, prevents wobbling of the reciprocating part as the reciprocating part moves up and down inside the low-temperature storage chamber 10, as well as defines the amount of rotary movement of the reciprocating part.

Since the in-storage guide 50 is disposed to be always inside the low-temperature storage chamber 10, fewer components move in and out of the low-temperature storage chamber 10 as compared to the low-temperature storage system 100 of Patent Literature 1, so that temperature rise in the low-temperature storage chamber 10 can be reduced.

Moreover, when retrieving a storage object (container C) inside the low-temperature storage chamber 10, the storage plate P set on a tray T is transported by the reciprocating part 30 to near the opening part of the low-temperature storage chamber 10, whereby only the storage object (container C) to be retrieved is picked up by the picking mechanism, which means other storage objects (containers C) are not exposed to the outside air and prevented from being deteriorated by temperature changes.

CITATION LIST

Patent Literature

[Patent Literature 1] Japanese Patent Application Publication No. 2012-56730
[Patent Literature 2] Japanese Patent No. 6177216

SUMMARY OF INVENTION

Technical Problem

There is still some room for further improvement with the known transport system described in, for instance, the patent literature mentioned above.

Namely, in the known transport system described in Patent Literature 2 mentioned above, while the in-storage guide is disposed to be always inside the low-temperature storage chamber, the reciprocating part and the engaging chains that drive the reciprocating part in and out of the low-temperature storage chamber travel from outside of the low-temperature storage chamber deep into the low-temperature storage chamber, bringing therewith heat from outside of the low-temperature storage chamber deep into the low-temperature storage chamber. There are thus concerns of deterioration due to heat transfer to the stored containers, and of increased costs for cooling materials.

Another drawback is the increased complexity in positioning the reciprocating part relative to the in-storage guide when the reciprocating part is transferred from outside of the low-temperature storage chamber to the in-storage guide.

Moreover, the use of engaging chains for the up-and-down movements of the reciprocating part causes an issue of large noises generated when the engaging chains mesh or the reciprocating part is transferred.

Depending on the depth of the low-temperature storage chamber or the length of the engaging chains, the external storage guide provided outside the low-temperature storage chamber has to be made large and heavy, which necessitates large space being secured in the upper part of the low-temperature storage chamber and the components supporting the external storage guide being reinforced, which leads to a further increase in cost.

The present invention solves these problems, and an object thereof is to provide a low-temperature storage system that can, with a simple structure, minimize heat transfer into the low-temperature storage chamber from outside of the low-temperature storage chamber, reduce a large noise during the operation of the machine, allow easy positioning of a reciprocating part inside the low-temperature storage chamber, and preclude device bulkiness outside the low-temperature storage chamber.

Solution to Problem

The present invention solves the problems described above by providing a low-temperature storage system storing a storage object at a low temperature, the low-temperature storage system including: a low-temperature storage chamber having a storage area for a storage object, and an opening part; and a transfer mechanism carrying the storage object into and out of the low-temperature storage chamber, the transfer mechanism including an in-storage unit installed in a stationary manner inside the low-temperature storage chamber, and an external unit installed outside the low-temperature storage chamber, the in-storage unit including a holding part holding the storage object, a reciprocating part connected to the holding part and being able to move up and down, a turn guide guiding the reciprocating part to move up and down and being able to turn inside the low-temperature storage chamber, and a lift member moving the reciprocating part up and down inside the low-temperature storage chamber, and the external unit including a torque transmission part connectable to the turn guide, a lift transmission part connectable to the lift member, and a detachable moving part driving the torque transmission part and the lift transmission part into and out of the low-temperature storage chamber.

Advantageous Effects of Invention

The low-temperature storage system of the invention according to claim 1 includes an in-storage unit installed in a stationary manner inside the low-temperature storage chamber, and an external unit installed outside the low-temperature storage chamber, and the in-storage unit includes a holding part holding the storage object, a reciprocating part connected to the holding part and being able to move up and down, a turn guide guiding the reciprocating part to move up and down and being able to turn inside the low-temperature storage chamber, and a lift member moving the reciprocating part up and down. This way, the reciprocating part and lift member can be disposed to be always inside the low-temperature storage chamber so that the reciprocating part and lift member do not cause heat transfer into the low-temperature storage chamber from outside.

Since the turn guide and lift member are disposed to be always inside the low-temperature storage chamber, the components on the external unit need not advance deep into the low-temperature storage chamber but advance only as far as to a position where a drive force can be transmitted to the turn guide and lift member. Therefore, the amount of heat transfer into the low-temperature storage chamber from outside can be reduced, and the connecting relationship between the turn guide and the torque transmission part, and the connecting relationship between the lift member and the lift transmission part, can be configured simply.

Moreover, since the external unit is configured only to be able to transmit a drive force to the in-storage guide, the noise generated during the operation can be reduced as compared to the case where engaging chains are used.

Furthermore, no large space for holding the engaging chains need to be secured, which allows the entire machine to be configured more lightweight.

Moreover, the lift member that directly causes the reciprocating part to move up and down is disposed to be always inside the low-temperature storage chamber and does not undergo temperature changes itself, so that it can move the reciprocating part reliably to an aimed position without being affected by expansion/contraction resulting from temperature changes.

According to the configuration set forth in claim 2, the turn guide is configured to be rotatable relative to the lift member, which means the reciprocating part can perform a turning movement and an up-and-down movement separately.

According to the configuration set forth in claim 3, the lift member is formed in a screw shape having, on a side face thereof, screw gear threads, and the reciprocating part is configured to be movable relative to the lift member along the screw gear threads. The reciprocating part can be moved up and down only by rotating the lift member, and the lift member itself does not need to move up and down, which allows stable operation of the reciprocating part.

Moreover, the reciprocating part engaged with the screw-like lift member offers higher power transmission efficiency than the reciprocating part suspended at an end part of engaging chains.

According to the configuration set forth in claim 4, the torque transmission part is at least partly made of resin. This reduces the amount of heat accumulated in the torque transmission part as compared to one that is entirely made of metal, enabling a reduction in heat transfer into the low-temperature storage chamber.

This also makes it harder for the heat retained in the upper part of the torque transmission part to be conducted to the turn guide when the torque transmission part is connected to the turn guide, so that heat transfer into the low-temperature storage chamber is prevented more reliably.

According to the configuration set forth in claim 5, the lift transmission part includes a coupling shaft configured to be connectable to the lift member, and the opening part of the low-temperature storage chamber is provided with a shutter, and the shutter includes a passage opening that allows the coupling shaft to pass therethrough. When moving the reciprocating part up and down, the coupling part passed through the passage opening can be connected to the lift member, with the opening part being closed with the shutter and with the torque transmission part being disconnected from the turn guide. This way, escape of cool air from the low-temperature storage chamber through the opening part can be inhibited.

In the case where the passage opening is formed as a cut-out extending as far as to a side of the shutter, the shutter may even be slid and removed, with the coupling shaft passed through the passage opening still being connected to the lift member, which means that the opening part can be opened wide enough to allow connection between the torque transmission part and the turn guide without disconnecting the coupling shaft from the lift member.

According to the configuration set forth in claim 6, the opening part is configured to allow at least the torque transmission part and lift transmission part to pass therethrough, as well as to allow a storage object to be carried therein and thereout, which allows the torque transmission part and the lift transmission part reliably to be connected to the in-storage unit, i.e., the turn guide and the lift member, respectively, inside the low-temperature storage chamber.

An upper part of the low-temperature storage chamber may be configured detachable, which allows easy maintenance of the interior of the low-temperature storage chamber, because the low-temperature storage chamber can be opened widely, by removing the upper part thereof, on the side where the opening part is provided.

DESCRIPTION OF EMBODIMENT

Figure 1:
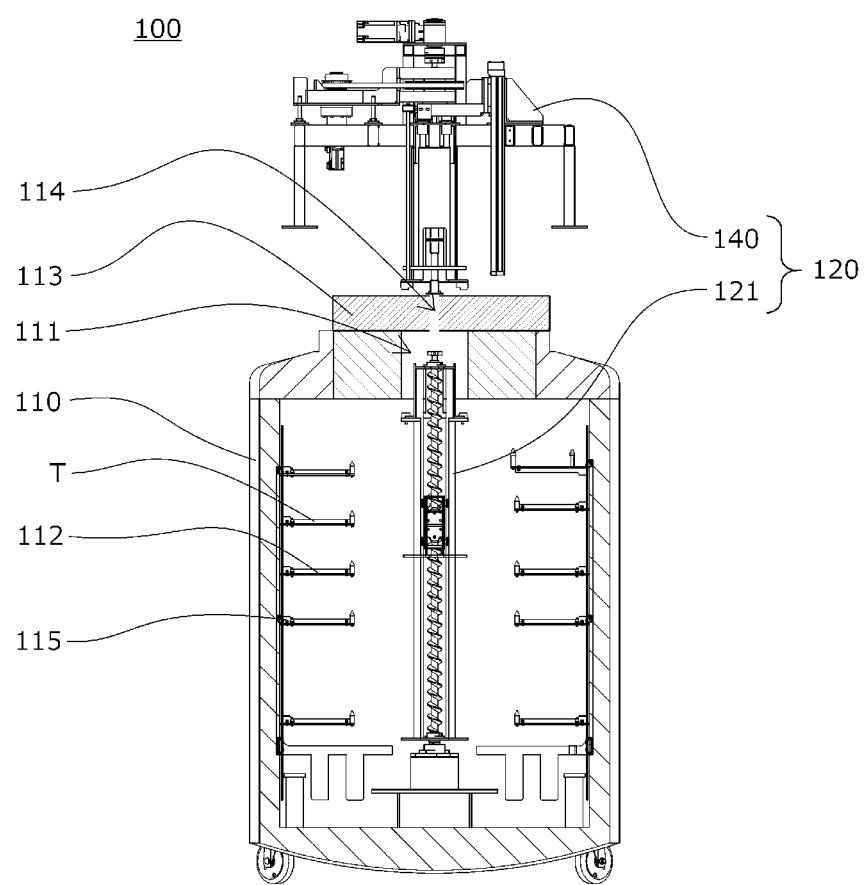
FIG. 1 is a front view of a low-temperature storage system 100 according to one embodiment of the present invention.
Figure 2:
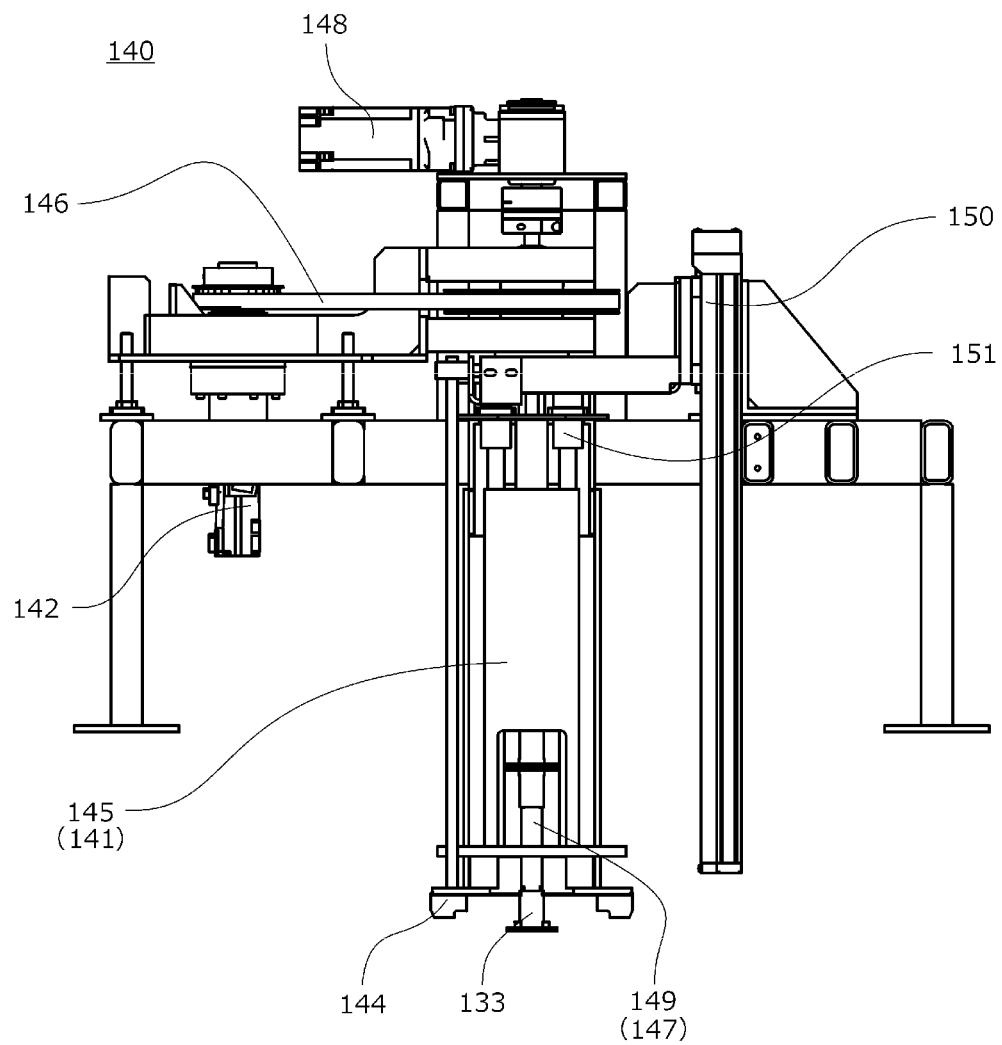
FIG. 2 is a front view of an external unit 140 of the low-temperature storage system 100 according to the embodiment of the present invention.
Figure 3:
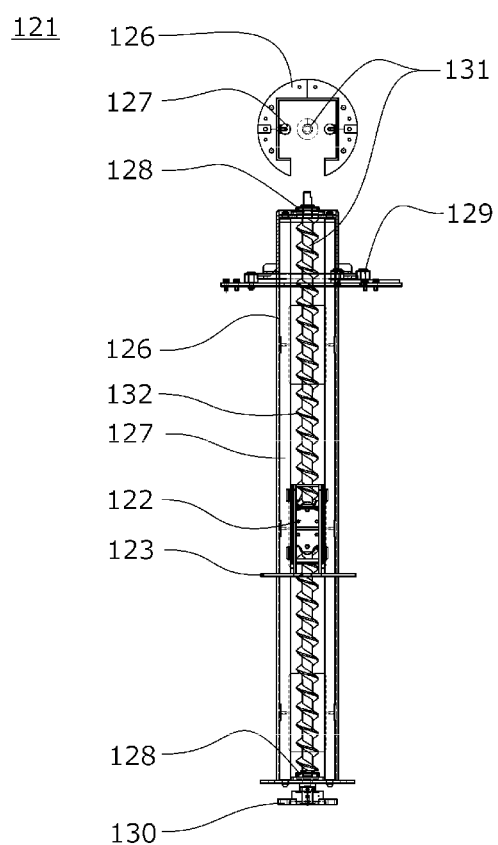
FIG. 3 shows a top plan view and a front view of an in-storage unit 121 of the low-temperature storage system 100 according to the embodiment of the present invention.
Figure 4:
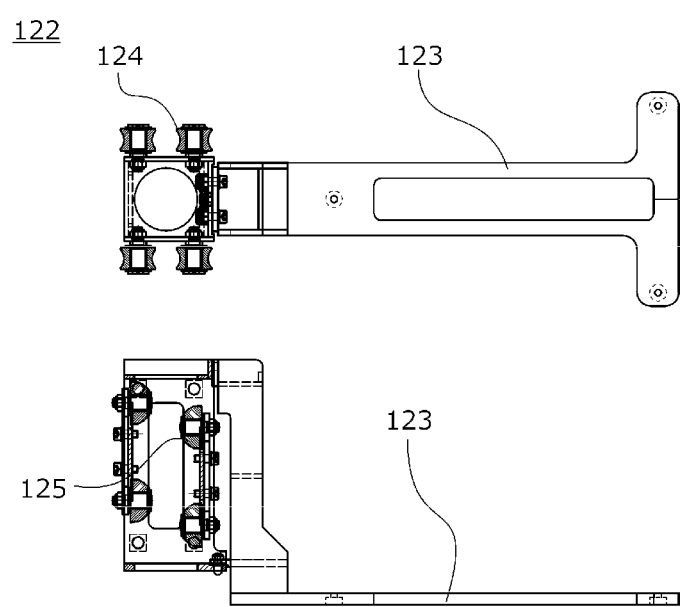
FIG. 4 shows a top plan view and a side view of a reciprocating part 122 of the low-temperature storage system 100 according to the embodiment of the present invention.

A low-temperature storage system 100 according to one embodiment of the present invention will be hereinafter described with reference to the drawings.

A low-temperature storage system 100 that is one embodiment of the present invention stores storage objects C at low temperatures, and includes, as illustrated in FIG. 1 to FIG. 4, a low-temperature storage chamber 110, the interior of which is kept at a low temperature, a plurality of plate-like stages 115 fixedly disposed in respective positions inside the low-temperature storage chamber 110, a transfer mechanism 120 carrying storage plates P into and out of the low-temperature storage chamber 110, and a picking mechanism (not shown) used for transferring storage objects C held on a storage plate P to another storage plate P.

The low-temperature storage chamber 110 further has a shutter 113 that can open and close an opening part 111. The shutter 113 is provided with a passage opening part 114 cut out in a size that allows a coupling shaft 149 to be described later to pass through.

The opening part 111 provided in the top face of the low-temperature storage chamber 110 in this way can prevent cool air inside the low-temperature storage chamber 110 from escaping to the outside so that the interior of the low-temperature storage chamber 110 can be kept at the low temperature.

Each stage 115 is provided with a plurality of storage areas 112 where trays T are disposed, and each storage area 112 is provided with frames that support both side parts of the tray T, and passage slits opened between the frames on both sides and extending in the up-and-down direction.

Figure 9:
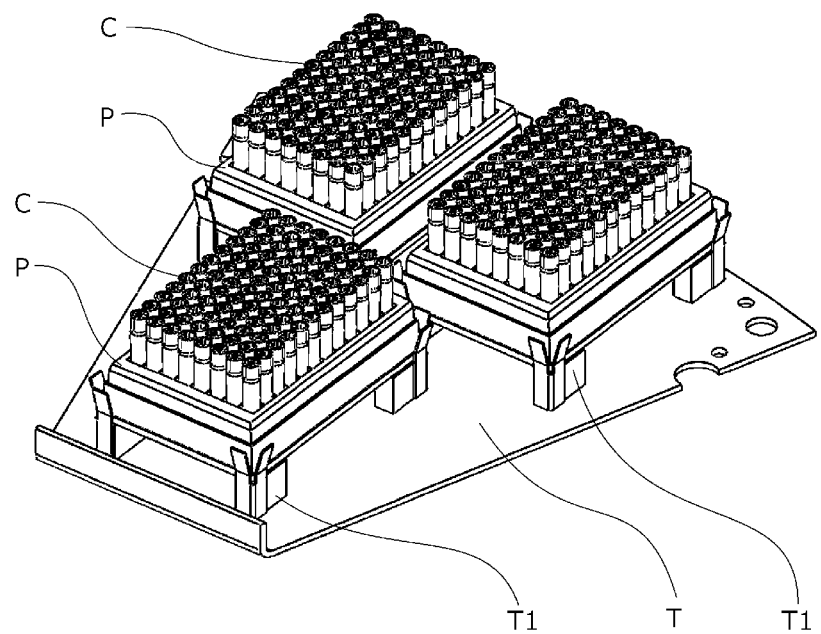
FIG. 9 is a perspective view illustrating a state of the low-temperature storage system 100 according to the embodiment of the present invention in which storage plates P accommodating storage objects C are stored on a tray T.

On the tray T, as illustrated in FIG. 9, a plurality of setting parts T1 are provided, and at each setting part T1, a storage plate P, accommodating a plurality of capped storage objects C containing samples, is removably set.

One of the slits has a shape and size that allow passage of the tray T and a holding part 123 to be described later, while the other slit has a shape and size that allow passage of only the holding part 123.

A picking operation, wherein storage objects C held on a storage plate P are transferred onto another storage plate P, can be performed on the uppermost stage 115, i.e., inside the low-temperature storage chamber 110, so that the temperature of the storage objects C can be kept at the low temperature.

The transfer mechanism 120 includes an in-storage unit 121 installed inside the low-temperature storage chamber 110 in a stationary manner, and an external unit 140 installed outside the low-temperature storage chamber 110.

The in-storage unit 121 includes a holding part 123 that is connected in a relatively rotatable manner to the low-temperature storage chamber 110 via a bearing unit 130 and transports the tray T, a reciprocating part 122 connected to the holding part 123 and able to move up and down, a turn guide 126 that guides up-and-down movements of the reciprocating part 122 and is able to turn inside the low-temperature storage chamber 110, and a lift member 131 that moves the reciprocating part 122 up and down inside the low-temperature storage chamber 110.

The external unit 140 includes a torque transmission part 141 connectable to the turn guide 126, a lift transmission part 147 connectable to the lift member 131, and a detachable moving part 150 driving the torque transmission part 141 and lift transmission part 147 into and out of the low-temperature storage chamber 110.

The reciprocating part 122 further includes turn-guide rollers 124 and lift member rollers 125. The turn-guide guide rollers 124 are disposed such as to hold a guide rod 127 provided to the turn guide 126 and extending up and down from both sides, and the lift member rollers 125 are disposed along recessed parts of screw gear threads 132 provided on a side face of the screw-shaped lift member 131.

The turn guide 126 and lift member 131 are connected to each other via a bearing unit 128 and configured to be rotatable relative to each other.

As described above, the reciprocating part 122, turn guide 126, and lift member 131, which are the in-storage unit 121, can be disposed to be always inside the low-temperature storage chamber 110, so that the reciprocating part 122, turn guide 126, and lift member 131 do not cause heat transfer into the low-temperature storage chamber 110 from outside of the low-temperature storage chamber 110 and the interior of the low-temperature storage chamber 110 can be kept at the low temperature.

The torque transmission part 141 is configured to be able to move in the up-and-down direction by a drive force transmitted from a torque servomotor 142 via a transmission belt 146. In a lower part of the torque transmission part 141, a coupling block 144 configured to be connectable to the turn guide 126 is provided.

The torque transmission part 141 includes a resin plate 145 between an upper part and a lower part thereof, which can inhibit heat propagation from the upper side of the torque transmission part 141 to the lower side thereof.

The lift transmission part 147 includes a coupling shaft 149 that can move in the up-and-down direction by a drive force transmitted from a lift servomotor 148. A lower part of the coupling shaft 149 and an upper part of the lift member 131 are configured to be removably attached to each other via a coupling 133.

A detachable moving part 150 is configured to be able to move the torque transmission part 141 in the up-and-down direction by a linear guide 151.

As described above, the external unit 140 is configured to enter only an upper part of the interior of the low-temperature storage chamber 110 to be connected to the in-storage unit 121, so that the amount of heat transfer into the low-temperature storage chamber 110 from outside of the low-temperature storage chamber 110 can be reduced.

As compared to the case of using engaging chains, the connecting relationship between the turn guide 126 and the torque transmission part 141, and the connecting relationship between the lift member 131 and the lift transmission part 147, can be configured simply, and the noise during the operation can be reduced.

Moreover, the amount of movement of the entire external unit 140 is small because the external unit 140 engages with and disengages from the in-storage unit 121 only through the up-and-down movements of the torque transmission part 141 and lift transmission part 147, which obviates the need to secure a large space in the upper part of the low-temperature storage chamber 110.

Next, a method of transporting storage objects C placed on a storage plate P on a tray T inside the low-temperature storage chamber 110 using the low-temperature storage system 100 of the present invention is described with reference to FIG. 5 to FIG. 8.

Figure 5:
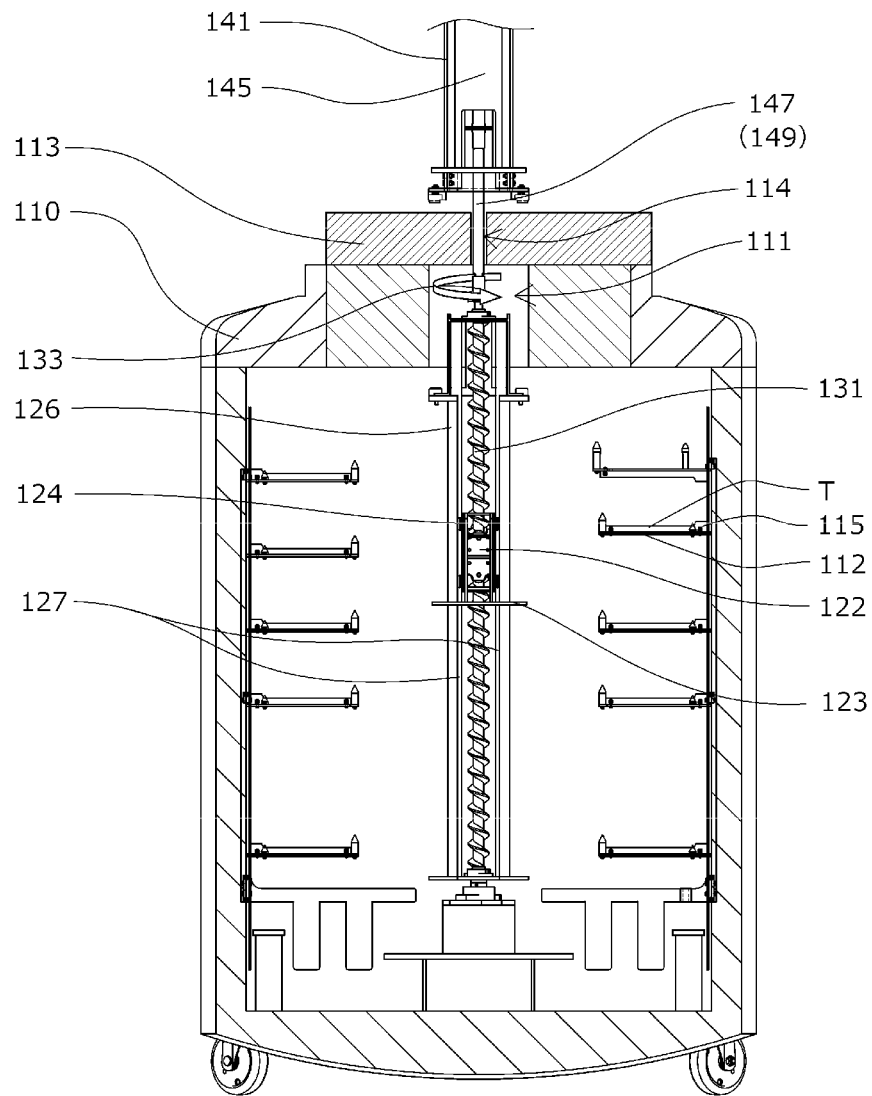
FIG. 5 is a front view illustrating a state of the low-temperature storage system 100 according to one embodiment of the present invention in which a lift transmission part 147 is connected to a lift member 131.

First, as illustrated in FIG. 5, the coupling shaft 149 passed through the passage opening part 114 of the shutter 113 is connected to the lift member 131 to enable transmission of rotation of the lift servomotor 148 to the lift member 131.

This makes it possible to turn the lift member 131 inside the low-temperature storage chamber 110 to move the reciprocating part 122 in the up-and-down direction by an operation from outside of the low-temperature storage chamber 110.

The opening part 111 is open to outside only in the portion of the passage opening part 114. Therefore cool air inside the low-temperature storage chamber 110 hardly escapes, and outside air hardly flows into the low-temperature storage chamber 110.

This makes it possible to keep temperature changes inside the low-temperature storage chamber 110 minimal to prevent deterioration of the storage objects C inside the low-temperature storage chamber 110.

Figure 6:
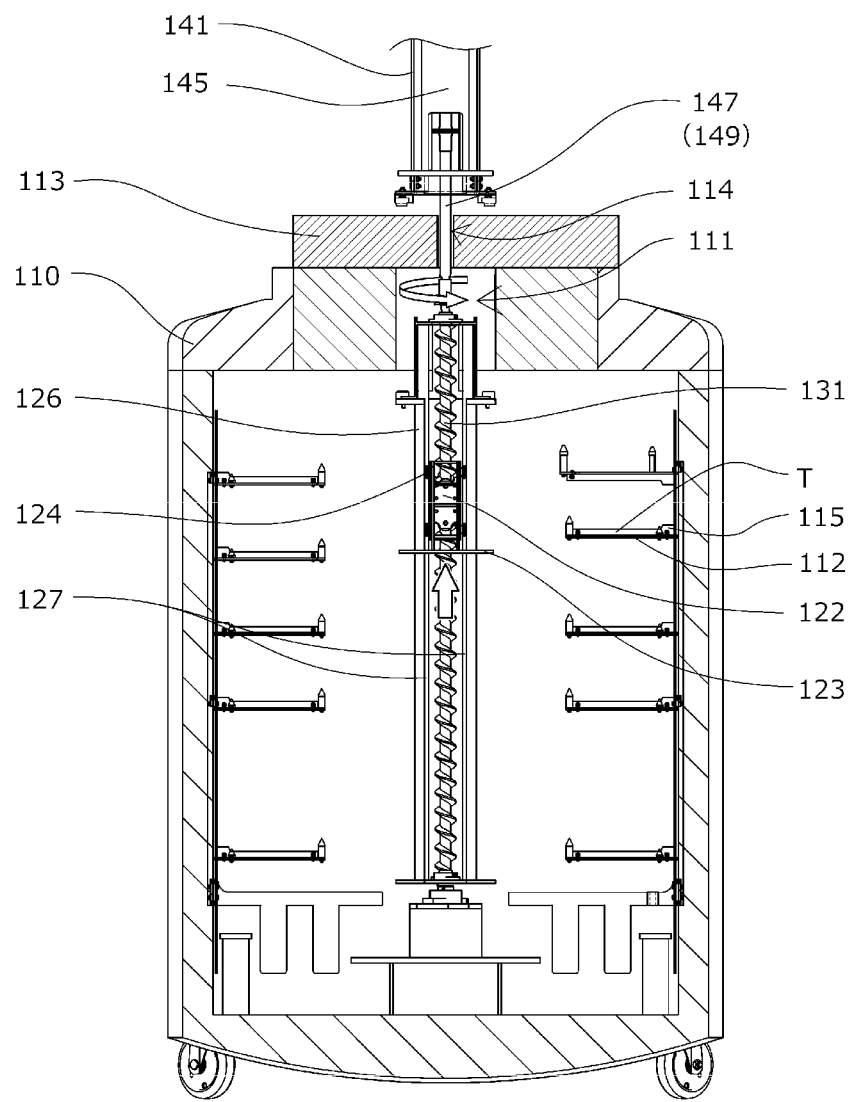
FIG. 6 is a front view illustrating an up-and-down movement of the reciprocating part 122 of the low-temperature storage system 100 according to the embodiment of the present invention.

Next, as illustrated in FIG. 6, the lift member 131 is turned to move the reciprocating part 122 to a height of the tray T on which storage objects C to be transported are placed.

The turn guide 126 and lift member 131 are connected to each other via the bearing unit 128 and configured to be rotatable relative to each other. Therefore, when the lift member 131 turns, the reciprocating part 122 clasping the guide rods 127 of the turn guide 126 can move in the up-and-down direction without turning, as the lift member rollers 125 slide along the recessed parts of the screw gear threads 132.

Since the lift member 131 itself does not move up and down but moves the reciprocating part 122 up and down only by a rotating movement thereof, the movement is readily made stable and the amount of movement of the reciprocating part 122 is easy to adjust.

Figure 7:
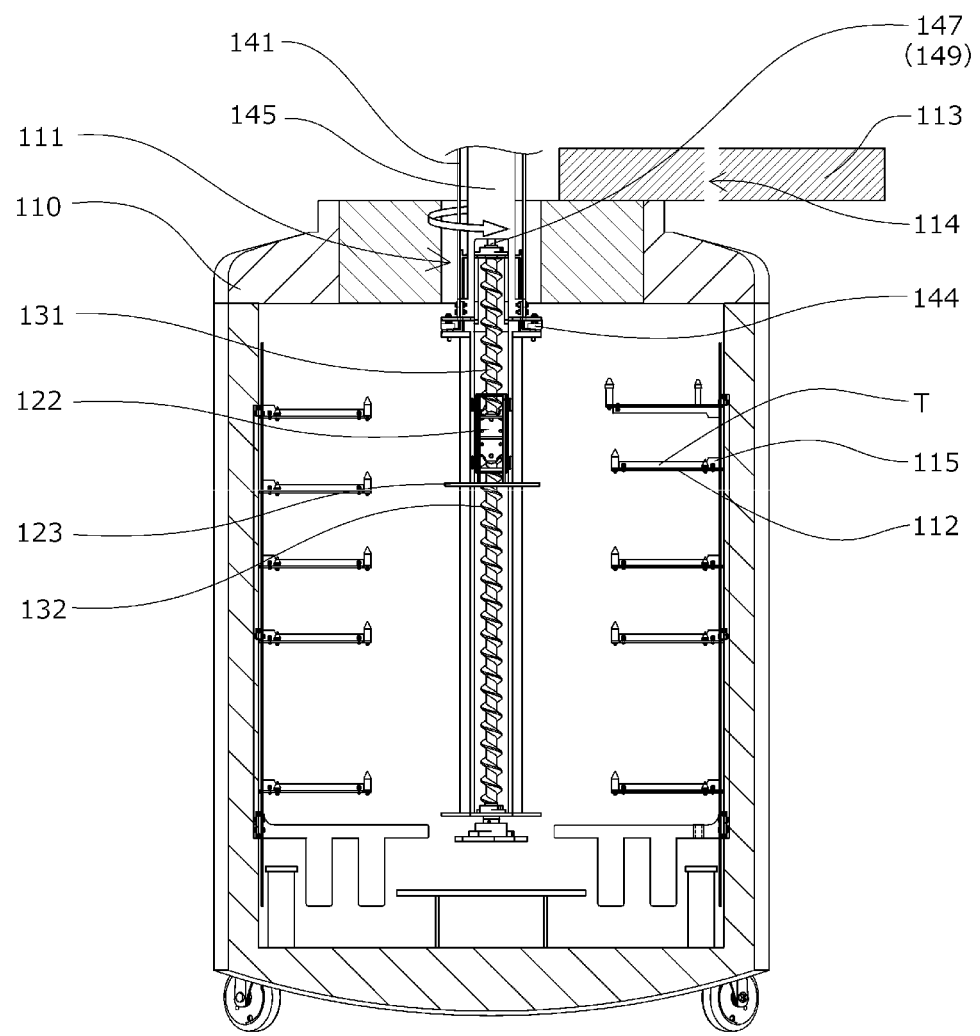
FIG. 7 is a front view illustrating a state of the low-temperature storage system 100 according to one embodiment of the present invention in which a torque transmission part 141 is connected to a turn guide 126.

After moving the reciprocating part to the height of the tray T on which storage objects C to be transported are placed, the shutter 113 is moved to open the opening part 111 widely as illustrated in FIG. 7, and the torque transmission part 141 is connected to the turn guide 126, to allow the rotation of the torque servomotor 142 to be transmitted to the turn guide 126.

The reciprocating part 122 can be turned by turning the turn guide 126. However, if, at this time, the turn guide 126 alone were turned, the reciprocating part 122 would go up or down, because the reciprocating part 122 turns along the recessed parts of the screw gear threads 132 on the lift member 131.

Therefore, when turning the turn guide 126, the lift member 131 is also turned a predetermined amount, so as to cause the reciprocating part 122 to turn without moving up or down.

Figure 8:
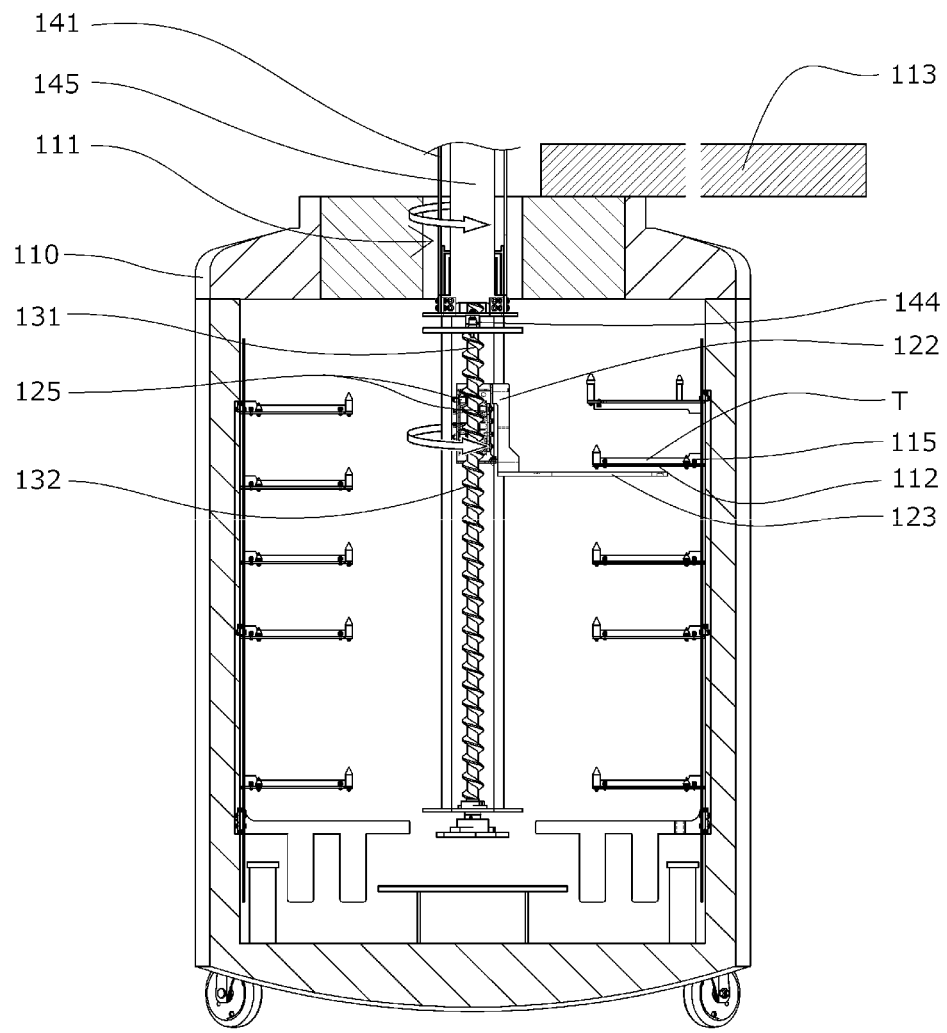
FIG. 8 is a front view illustrating a rotating movement of the reciprocating part 122 of the low-temperature storage system 100 according to the embodiment of the present invention.

After the reciprocating part 122 has been positioned relative to the tray T carrying the storage objects C to be transported, as illustrated in FIG. 8, the lift member 131 is turned to lift the tray T with the holding part 123, and further, the turn guide 126 is turned to swivel the holding part to a position where it does not interfere with other trays T. After that, the reciprocating part 122 is lifted toward the opening part 111 to move the tray T that is the target of transportation to the space above the uppermost stage 115.

Next, the holding part 123 is swiveled and then moved down in the space above the uppermost stage 115, to set the tray T that is the target of transportation in a picking area of the uppermost stage 115.

Lastly, in the picking area, desired storage objects C are transferred from the storage plate P that was holding the target storage objects C by a picking mechanism (not shown)

onto another storage plate P, and the storage plate P accommodating only the desired storage objects C is taken out.

This makes it possible to prevent deterioration of other storage objects C than the desired ones by temperature changes because they are not taken out of the low-temperature storage chamber 110.

Alternatively, the storage plate P may be taken out of the low-temperature storage chamber 110 using the holding part 123 or a separate chuck unit, or by various other methods such as by hand.

While one embodiment of the present invention has been described above in detail, the present invention is not limited to the embodiment described above. Various design changes may be made without departing from the scope of the claims set forth in the claims.

While the low-temperature storage chamber includes a shutter that can open and close an opening part, the shutter being provided with a passage opening cut out in a size that allows the coupling shaft to pass through in the embodiment described above, the design of the opening part of the low-temperature storage chamber is not limited to this. For example, in an alternative configuration, the shutter may not be provided with the passage opening, and the coupling shaft may be moved into the low-temperature storage chamber from the opening part after the shutter has been removed, or, the shutter may be provided with a through hole for allowing the coupling shaft to pass through.

In the embodiment described above, the low-temperature storage chamber is configured such that a plurality of stages having storage areas are set therein, wherein a transfer path extending in the up-and-down direction is formed by connecting together the transfer slits formed to respective stages. This should not limit specific aspects of the low-temperature storage chamber. The invention is applicable to any low-temperature storage chamber that has storage areas for storage objects and an opening part.

While the opening part of the low-temperature storage chamber is provided in the top surface of the low-temperature storage chamber in the embodiment described above, the position of the opening part is not limited to this and the opening part may be formed, for example, in a side face of the low-temperature storage chamber.

In the embodiment described above, the lift member rollers are disposed along recessed parts of the screw gear threads provided on the side face of the screw-like lift member so that turning the lift member causes the lift member rollers to slide along the recessed parts of the screw gear threads and to move in the up-and-down direction. The method whereby the reciprocating part is moved up and down is not limited to this. For example, a belt may be stretched around the lift member for rotation in the up-and-down direction so that the belt or a chain is rotated by the torque transmitted from the lift transmission part in the up-and-down direction, to cause the reciprocating part connected to the belt to move up and down.

While the torque transmission part in the embodiment described above includes a resin plate between an upper part and a lower part thereof, the configuration of the torque transmission part is not limited to this. For example, the resin plate may be omitted, or the torque transmission part may be entirely made of a resin material.

While the lift member and the lift transmission part are connected to each other via a coupling in the embodiment described above, the method of connecting the lift member and the lift transmission part is not limited to this. Any method may be adopted as long as rotation can be transmitted from the lift transmission part to the lift member.

Figure 10:
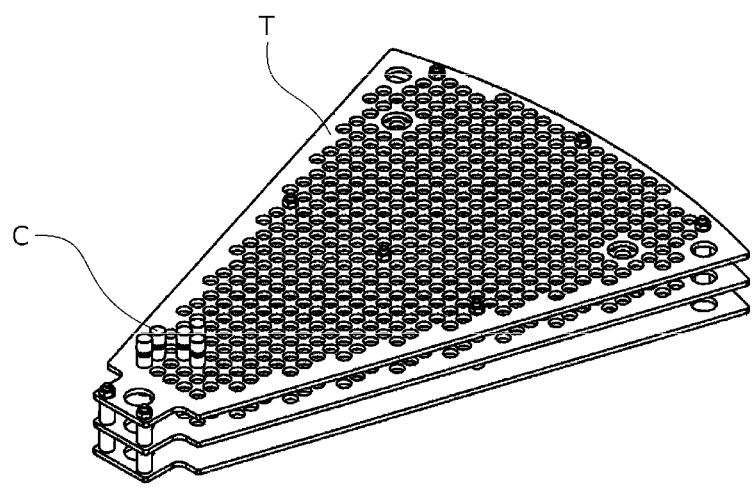
FIG. 10 is a perspective view illustrating a state of the low-temperature storage system 100 according to the embodiment of the present invention in which storage objects C are directly stored on a tray T.

While a plurality of storage objects are held on a storage plate that is set on a tray in the embodiment described above, specific storage methods of storage objects are not limited to this. For example, as illustrated in FIG. 10, a plurality of storage objects may be directly held on a tray.

While a picking area is provided inside the low-temperature storage chamber and storage objects held on a storage plate are transferred to another storage plate in the picking area in the embodiment described above, such picking area or picking means may or may not be provided suitably as required.

While the stages are fixedly disposed in their respective positions inside the low-temperature storage chamber in the embodiment described above, the configuration of the stages is not limited to this. For example, the stages may be configured to be capable of rotary motion around the center axis of the low-temperature storage chamber as the rotation axis.

REFERENCE SIGNS LIST

100 Low-temperature storage system
110 Low-temperature storage chamber
111 Opening part
112 Storage area
113 Shutter
114 Passage opening part
115 Stage
120 Transfer mechanism
121 In-storage unit
122 Reciprocating part
123 Holding part
124 Turn-guide guide roller
125 Lift member roller
126 Turn guide
127 Guide rod
128, 130 Bearing unit
129 Guide roller
131 Lift member
132 Screw gear thread
133 Coupling
140 External unit
141 Torque transmission part
142 Torque servomotor
144 Coupling block
145 Resin plate
146 Transmission belt
147 Lift transmission part
148 Lift servomotor
149 Coupling shaft
150 Detachable moving part
151 Linear guide
C Storage object
P Storage plate
T Tray
T1 Setting part

The invention claimed is:

1. A low-temperature storage system storing a storage object at a low temperature, the system comprising:
a low-temperature storage chamber having a storage area for a storage object, and an opening part; and a transfer mechanism carrying the storage object into and out of the low-temperature storage chamber,
the transfer mechanism including an in-storage unit installed in a stationary manner inside the low-temperature storage chamber, and an external unit installed outside the low-temperature storage chamber, the in-storage unit including a holding part holding the storage object, a reciprocating part connected to the holding part and being able to move up and down, a turn guide guiding the reciprocating part to move up and down and being able to turn inside the low-temperature storage chamber, and a lift member moving the reciprocating part up and down inside the low-temperature storage chamber, and the external unit including a torque transmission part connectable to the turn guide, a lift transmission part connectable to the lift member, and a detachable moving part driving the torque transmission part and the lift transmission part into and out of the low-temperature storage chamber.

2. The low-temperature storage system according to claim 1, wherein the turn guide is configured to be rotatable relative to the lift member.

3. The low-temperature storage system according to claim 1, wherein the lift member is formed in a screw shape having, on a side face thereof, screw gear threads, and the reciprocating part is configured to be movable relative to the lift member along the screw gear threads.

4. The low-temperature storage system according to claim 1, wherein the torque transmission part is at least partly made of resin.

5. The low-temperature storage system according to claim 1, wherein the lift transmission part includes a coupling shaft configured to be connectable to the lift member, the opening part of the low-temperature storage chamber is provided with a shutter, and the shutter includes a passage opening that allows the coupling shaft to pass therethrough.

6. The low-temperature storage system according to claim 1, wherein the opening part is configured to allow at least the torque transmission part and the lift transmission part to pass therethrough, as well as to allow a storage object to be carried therein and thereout.

* * * * *